(12) United States Patent
Rataj

(10) Patent No.: US 11,135,676 B2
(45) Date of Patent: Oct. 5, 2021

(54) MACHINING HEAD FOR LASER MACHINING MACHINE, AND LASER MACHINING MACHINE

(71) Applicant: Bystronic Laser AG, Niederönz (BH)

(72) Inventor: Thomas Rataj, Oberoenz (CH)

(73) Assignee: Bystronic Laser AG, Niederönz (CH)

(*) Notice: Subject to any disclaimer, the term of this patent is extended or adjusted under 35 U.S.C. 154(b) by 753 days.

(21) Appl. No.: 15/520,115

(22) PCT Filed: Oct. 20, 2015

(86) PCT No.: PCT/IB2015/058071
§ 371 (c)(1),
(2) Date: Aug. 31, 2017

(87) PCT Pub. No.: WO2016/063215
PCT Pub. Date: Apr. 28, 2016

(65) Prior Publication Data
US 2017/0304939 A1    Oct. 26, 2017

(30) Foreign Application Priority Data
Oct. 20, 2014 (EP) .................................. 14189586

(51) Int. Cl.
*B23K 26/06* (2014.01)
*B23K 26/10* (2006.01)
(Continued)

(52) U.S. Cl.
CPC .......... *B23K 26/106* (2013.01); *B23K 26/048* (2013.01); *B23K 26/0643* (2013.01);
(Continued)

(58) Field of Classification Search
CPC .. B23K 26/06; B23K 26/048; B23K 26/0643; B23K 26/38; B23K 26/1462; G02B 5/08; G02B 5/0825
See application file for complete search history.

(56) References Cited

U.S. PATENT DOCUMENTS 5,097,110 A * 3/1992 Hamada ............. B23K 26/0643
                                                             219/121.63
5,493,095 A    2/1996 Bruschi
(Continued)

FOREIGN PATENT DOCUMENTS

CN        1842393 A    10/2006
CN      102144182 A     8/2011
(Continued)

OTHER PUBLICATIONS

Machine Translation WO2008/025811—Nov. 25, 2019 (Year: 2008).*
(Continued)

*Primary Examiner* — Brian W Jennison
(74) *Attorney, Agent, or Firm* — Jacob Eisenberg

(57) ABSTRACT

The invention relates to a machining head (1) for laser machining machines, in particular for laser cutting machines, having an interface to a laser light source (3), preferably to fiber-coupled or fiber-based laser sources. Said laser sources are designed for more than 500 W of average output power in the near infrared region. The interface is preferably designed for coupling an optical waveguide (2) for the working laser beam (6). The machining head (1) also has a focusing optical unit (11) having preferably only one imaging lens. A deflecting assembly (9, 10) for at least one single deflection of the working laser beam (6) is arranged between the interface and the focusing optical unit (11). Said deflecting assembly (9, 10) is designed as a passive optical
(Continued)

element that changes the divergence of the working laser beam (6) in dependence on power.

22 Claims, 2 Drawing Sheets

(51) Int. Cl.
  *B23K 26/38*   (2014.01)
  *B23K 26/14*   (2014.01)
  *G02B 5/08*   (2006.01)
  *B23K 26/04*   (2014.01)

(52) U.S. Cl.
  CPC .......... *B23K 26/1462* (2015.10); *B23K 26/38* (2013.01); *G02B 5/08* (2013.01); *G02B 5/0825* (2013.01)

(56) References Cited

U.S. PATENT DOCUMENTS

| | | | | |
|---|---|---|---|---|
| 6,420,676 | B2* | 7/2002 | Sawai | H05K 3/0026 219/121.7 |
| 6,791,057 | B1* | 9/2004 | Kratzsch | B23K 26/032 219/121.62 |
| 2005/0252895 | A1* | 11/2005 | Schuermann | B23K 26/03 219/121.83 |
| 2007/0029289 | A1* | 2/2007 | Brown | B23K 26/0643 219/121.6 |
| 2009/0266989 | A1* | 10/2009 | Schwarz | G01B 11/24 250/358.1 |
| 2011/0180521 | A1* | 7/2011 | Quitter | B23K 26/03 219/121.73 |
| 2013/0043225 | A1* | 2/2013 | Schurmann | B23K 26/048 219/121.64 |
| 2014/0203318 | A1 | 7/2014 | Matsui et al. | |

FOREIGN PATENT DOCUMENTS

| | | |
|---|---|---|
| CN | 102658431 A | 9/2012 |
| DE | 4324848 C1 | 3/1995 |
| DE | 4435531 A1 | 4/1995 |
| DE | 202004007511 U1 | 8/2004 |
| DE | 102009047105 | 11/2009 |
| DE | 102010011253 A1 | 9/2011 |
| DE | 202012102794 U1 | 8/2012 |
| EP | 0152268 | 8/1985 |
| EP | 0515983 A | 12/1992 |
| JP | S60203901 A | 10/1985 |
| JP | A6177726 A | 4/1986 |
| JP | 2012237796 A | 12/2012 |
| JP | 2014139997 A | 7/2014 |
| JP | 2014172082 A | 9/2014 |
| WO | 2008025811 A1 | 3/2008 |
| WO | WO2021027657 A1 | 2/2021 |

OTHER PUBLICATIONS

English language translation of JP2014172082A2.
English language translation of JP201223779(6).
English language translation of JPS6177726(A).
English language translation of JPS60203901(A).
CN1842393A English Language Translation.
CN102144182A English Language Translation.
CN102658431A English Language Translation.
DE432484C1 English Language Translation.
DE4435531A1 English Language Translation.
WO2021027657A1 English Language Translation.

\* cited by examiner

MACHINING HEAD FOR LASER MACHINING MACHINE, AND LASER MACHINING MACHINE

FIELD OF INVENTION

The invention pertains to a machining head for laser machining machines, particularly for laser cutting machines, according to the preamble of claim 1, as well as to a laser machining machine with such a machining head according to the preamble of claim 13.

BACKGROUND

When such laser machining machines are used for metal machining, for example, they are operated in a high-power range that lies considerably above the power range, in which medical laser systems, for example, according to EP 0515983 A1 are operated. These lasers respectively operate in low or medium power ranges and do not have to overcome the problems arising in laser sources with an output power in excess of 500 W due to the thermal stress of the optical elements.

Important elements of a laser machining machine, particularly a laser cutting machine, are the laser beam source, the laser beam guidance and the machining head (focusing optics) including cutting nozzle. The beam exiting the laser beam source can be guided to the focusing optics at the machining point by means of optical waveguides when using lasers that operate in the near-infrared range (Nd:YAG lasers, fiber lasers, disk lasers, direct diode lasers) and by means of deflecting mirrors when using CO2 lasers. The focusing optics focus the laser beam in a focal point and thereby generate the intensity required for the cutting process.

Systems with CO2 lasers mostly consist of a stationary laser beam source, reflecting mirrors and focusing optics in the machining head. A reflector telescope ensures a virtually collimated beam, which has only slight divergences or convergences, over the entire machining space. The beam diameters on the focusing optics are therefore identical or approximately identical and also result in equivalent F-numbers and intensities in the focal point. Corresponding laser machining heads preferably deflect this collimated beam by 90°, typically by means of a deflecting mirror with variable curvatures, such that the focal point positions downstream of the focusing optics can be changed. According to U.S. Pat. No. 5,493,095A, cantilevered focusing optics are also capable of changing the focal point position and thereby correcting the slight divergence or convergence of the collimated laser beam.

The beam guidance between the resonator (laser beam source) and the focusing optics is realized by means of deflecting mirrors that, if applicable, are water-cooled. The deflecting mirrors are coated with gold or molybdenum and consist of monocrystalline silicon or pure copper. Laser radiation in a wavelength range of approximately 1 μm (Nd:YAG lasers, fiber lasers, disk lasers), in contrast, can be guided to the machining head over great distances without losses by means of a flexible fiber-optic cable.

Deflecting mirrors are used in laser machines for various purposes. For example, DE 202004007511 U1 discloses the utilization of a partially reflecting deflecting mirror for decoupling a small portion of the laser radiation for the purpose of a power measurement. However, the working laser beam passes through this deflecting mirror with apparently unchanged divergence. The small decoupled portion is then reflected on a detector by means of a curved deflecting mirror. The partially reflective deflecting mirror is optimized for the transmission of the majority of the laser radiation and features an antireflection coating for this purpose.

On the other hand, DE 102009047105 A1 discloses imaging optics that feature an optical fiber with a fiber exit face, from which the laser beam exits divergently, as well as reflective focusing optics. The disclosed imaging optics form an image of the divergent laser beam in a focal point. The reflective focusing optics consist of a single reflective focusing mirror element, the mirror surface of which is designed for a point-to-point image formation of the fiber exit face in the focal point.

In order to achieve a directionally independent cutting quality, the linearly polarized laser beams are circularly polarized downstream of the CO2 laser resonator by means of a phase-shifting deflecting mirror. The deflecting mirrors used have a multilayer coating, the function of which corresponds to a quarter-wave plate. The polarization-dependent absorption of laser radiation in the cutting gap would lead to a directionally dependent edge quality and cutting efficiency. The laser radiation of laser sources in the near-infrared range is typically unpolarized at least averaged over time.

The focusing optics in the machining head of a near-infrared laser source typically consist of silica glass whereas the focusing optics of a CO2 laser consist of monocrystalline zinc selenide or an off-axis parabolic mirror of copper. The beam passes through the so-called cutting nozzle in a focused fashion, wherein said cutting nozzle usually consists of copper and also directs the blowing gas or process gas at the machining point.

However, the high parallelism of a coupled laser beam is eliminated in optical fibers between the laser source and the laser machining head due to different reflection angles between core and cladding such that the light exiting the optical fiber typically has a much higher divergence than, e.g., a CO2 laser. In order to reduce this divergence, DE 43 24 848 proposes to provide an optical system (preferably a collimating lens) downstream of the optical fiber referred to the light propagation direction, wherein said optical system parallelizes the light beam exiting the optical fiber.

The thusly collimated beam therefore has only slight divergences or convergences. In modern machining heads, a mirror deflection is typically not realized until the beam has been collimated in the above-described fashion. The slight angular deviations allow a comparatively simple design of the dielectric coatings of corresponding deflecting optics.

The deflection of a divergent beam is basically more difficult such that this approach was previously not applied to machining heads. For example, severe aberrations are created in the transmitting direction and significantly complicate a sound image formation of the process zone or the nozzle region, respectively. In addition, a wider angular range caused by the divergent beam has to be taken into account in the design of the mirror coating.

According to DE 202012102794 U1, the beam to be measured, particularly in fiber-based laser systems for 1 μm laser radiation, is usually divergent analogous to, e.g., a beam exiting a fiber tip or a beam focused by machining optics. In this German utility model, it is furthermore mentioned that it is problematic to utilize an inclined, uncoated parallel plate for decoupling a partial beam from a divergent beam because the angle of incidence on the parallel plate varies within the light beam such that the reflectance according to the Fresnel formulas is not constant and also dependent on the polarizing direction of the beam.

In this case, a reduction of this angular dependence is achieved by maintaining small angles of incidence on both parallel plates.

In order to circumvent the problem of the angular dependence of the reflection, it is also conceivable to initially collimate the beam by means of a collimating objective or at least one lens before a partial beam is deflected by means of a suitable coating of the parallel plate. In this context, for example, DE 20 2004 007 511 describes a special antireflection coating, which should be realized in such a way that the residual reflectance varies as little as possible over a small angular range and the reflectance for both polarizing directions is at the same time as equivalent is possible. For this purpose, several thin dielectric layers are applied on the substrate.

In order to reduce the reflection differences in different states of polarization, it is known from the prior art to provide the boundary surfaces of a partially reflecting deflecting mirror with suitable coatings. For example, these boundary surfaces are provided with special antireflection coatings, which should be realized in such a way that the residual reflectance varies as little as possible over a small angular range and the reflectance for both polarizing directions is at the same time as equivalent is possible. Several thin dielectric layers have to be applied on the substrate for this purpose. This is the approach proposed, for example, in DE 20 2004 007 511. The layer system for the coating of a deflecting mirror disclosed in this publication consists of six individual layers, the layer thickness of which has to be strictly observed. For a person skilled in the relevant art, it is quite obvious that production-related tolerances occur in this case and that it is therefore very difficult to ensure the desired constancy of the reflection, particularly also under long-term conditions that can notoriously lead to changes of thin layers due to aging, humidity, etc. Another problem can be seen in that this coating has to be applied on both sides of the plate and the portions of the radiation reflected by the front and the rear side of the plate can interfere with one another, which in turn can lead to fluctuations of the measured intensity.

The beam of a fiber-guided laser is much more divergent at the fiber exit point than the beam of a CO2 laser. It is therefore attempted to initially collimate the divergent beam in the machining head. Consequently, the deflection is carried out in the collimated beam path upstream of the focusing optics.

Another problem arises if the beam is initially collimated by means of an objective or a lens or projected otherwise before a partial beam is decoupled. When the radiation passes through the lens, a minimal portion of the radiation is absorbed by the material and in the coating of the lens. As the beam power (power dependence) and the service life (thermalization time) of a laser source increase, heating of the optical systems also increases such that changes of the focal point position (so-called focal point shifts) and of the focal point geometry (so-called aberrations) occur. These effects are referred to as a thermal lens and are dependent on the materials used, as well as their coating.

The beam of a fiber-guided laser is much more divergent at the fiber exit point than the beam of a CO2 laser. It is therefore attempted to initially collimate the divergent working laser beam in the machining head. Consequently, the deflection is carried out downstream of the collimating lens and upstream of the focusing optics. FIG. 1 of DE 102010011253 A1 shows a highly schematic illustration of a laser machining head, particularly a laser machining head of the type used in laser machining machines or laser machining systems. In this case, a working laser beam arriving from the laser machining machine is projected on a workpiece through a housing of the laser machining head by means of a deflecting assembly.

Corresponding laser machining heads preferably deflect this collimated laser beam by 90°, typically by means of a deflecting mirror with variable curvatures, such that the focal point positions downstream of the focusing optics can be changed.

A beam splitter is arranged in the passage area for the working laser beam in the housing of the laser machining head such that a monitoring beam path (indicated with its optical axis) of a camera can be decoupled from the beam path of the working laser beam. Focusing optics and an optical band-pass filter are arranged in the monitoring beam path upstream of the camera. In the exemplary embodiment illustrated in Figure of DE 102010011253 A1, the monitoring beam path of the camera is directed at a working area of the workpiece by means of the beam splitter.

Deflecting devices typically also have to be cooled by means of correspondingly elaborate devices that increase the dimensions and the weight of the machining head. In modern machining heads, it is preferred to cool parts of the deflecting device that are exposed to transmitted laser radiation or scattered radiation. However, the cooling devices may also be used for the temperature control of optical systems. The present invention is therefore based on the objective of eliminating the disadvantages of the above-described known constructions and realizing, in particular, a compact design with minimal adjusting or optics positioning effort, especially for fiber-guided or fiber-based laser sources. This can be achieved, if so required, by means of a simple optical system with only a few lenses and therefore little aberration.

SUMMARY

This objective is attained with the characteristics of independent claim 1 and independent claim 13. Advantageous enhancements are disclosed in the figures and in the dependent claims.

According to the invention, a machining head for laser machining machines is provided with an interface to a laser light source and with focusing optics, wherein said interface is preferably designed for coupling an optical waveguide for the working laser beam. In this context, it is preferred to use fiber-coupled or fiber-based laser sources that operate in the near-infrared range. The invention is particularly intended for laser sources in the near—infrared range with an average output power in excess of 500 W. All optical systems that are transmissive to laser light (particularly the focusing optics and potential glass guards) are preferably made of materials with sound thermal conductivity (>10 W/m*K)). A cooling system (e.g. water cooling system) is preferably used for optical materials with sound thermal conductivity. Furthermore, the invention utilizes focusing optics that preferably comprise only one imaging lens, which is particularly realized in the form of an aspherical lens.

According to the invention, such a machining head is characterized in that a deflecting assembly for at least a single deflection of the working laser beam is arranged between the interface and the focusing optics and designed in the form of a passive optical element that changes the divergence of the working laser beam in dependence on the power. The power dependence frequently, but not exclusively, manifests itself in the form of a temperature-inducing effect that is caused, in particular, by local heating of the optical elements. However, effects that are not directly temperature-dependent also occur in this case.

For example, the thermal lens is power-dependent and not directly temperature-dependent. A lens penetrated by radiation can thereby be heated and only locally generate a temperature gradient that creates a thermal lens. However, there are also mechanisms that create a thermal lens. All mechanisms are predominantly power-dependent. Variations also occur, for example, due to the material selection. For example, if the material is changed to sapphire, the power-dependent thermal lens also changes. Materials such as sapphire and zinc sulfide have a sound thermal conductivity and should preferably be cooled. Silica glass requires no cooling because the generated heat is a hardly transported in the radial direction.

Consequently, the beam path between the interface and the deflecting assembly is kept free of optical elements that change the divergence of the working laser beam, i.e. elements that are concretely designed for influencing the divergence in a deliberate or purposeful and defined fashion. However, optical elements could unintentionally and/or randomly influence the divergence of the working laser beam to an uncertain degree. For example, glass guards can influence the divergence due to thermal effects, but this side effect is not taken into consideration in the present invention.

At high laser output powers in excess of 500 W, the combination of cooled focusing optics of an optical material with sound thermal conductivity and a deflecting mirror positioned upstream thereof in the divergent beam provides the advantage that this optical system reaches at these output powers a stable thermal state with minor focal point shift within a few seconds and therefore ensures high process reliability.

Due to the thermal stress of the deflecting mirror in the inventive application in the high-power range, the change of the divergence on this deflecting mirror particularly takes place in a power-dependent and therefore usually also temperature-dependent fashion. In this way, the focal point shift caused by the focusing optics can be partially and ideally even completely compensated over the entire power range.

According to the invention, a very compact design for machining heads can thereby be achieved, wherein a camera-based process light image and process light control can also be realized with simple measures by means of single-lens systems. Due to the deflection in the divergent beam, developed machining hands can be constructed on the basis of a few lenses or even only a single lens such that the required structural space is significantly reduced. The small structural size and the associated weight reduction of machining heads are particularly needed for meeting increasing machine dynamics requirements. The option of a compact and lightweight single-lens design downstream of the deflecting device is also particularly advantageous for attaining high dynamics with the inventive machining head. The deflection in the divergent beam also makes it possible to realize the full functional scope of machining heads such as, e.g., adjustments of the imaging magnification, process light control, camera-based process light monitoring, beam shaping, etc.

The deflecting assembly preferably consists of a deflecting mirror with essentially constant curvature, preferably a planar deflecting mirror. This deflecting mirror is preferably mounted on a supporting surface in a stressfree fashion, particularly by means of a multi-point fastening arrangement or an adhesive. In this way, the substrate can be easily mounted in a stressfree fashion, wherein an expansion or deformation of the substrate is nevertheless also possible.

For such a solution, it is particularly advantageous if the deflecting mirror of the deflecting assembly is formed by a substrate with a plurality of dielectric layers applied on its front side facing the working laser beam. In this case, the dielectric layers system is optimized for maximum reflection in an angular range between 2° and 20°, preferably between 3° and 7°, around the angle of incidence of the working laser beam, wherein the angle of incidence of any portion of the working laser beam lies between 1° and 89°.

A stress-compensating equalization coating is preferably applied on the rear side of the substrate in order to ensure a sound dimensional stability of the substrate. This equalization coating may have the same properties as the coating on the front side of the substrate and preferably be identical to the coating of the front side in order to thereby achieve a significant reduction of the direct leakage radiation. However, it would also be conceivable to apply a coating with antireflective properties that allows optimal process light and nozzle monitoring or, if so required, a pure glass coating. Any combinations of the cited coatings are also possible.

According to the invention, the substrate of the deflecting mirror for a zinc sulfide lens or a sapphire lens, which are usually also cooled, consists of silica glass. Due to the likewise power-dependent influence on the divergence, such an adapted material selection for the focusing optics and the deflecting mirror for the laser beam makes it possible to compensate or at least significantly reduce thermally related effects, particularly the focal point shift of the focusing optics, by means of the deflecting assembly.

Another embodiment of the invention is characterized by devices for monitoring beams that are transmitted through the substrate or reflected within the substrate. Consequently, a process monitoring/control and at the same time a laser or back-reflection monitoring can also be realized with a minimal space requirement in this embodiment.

A protective window and/or, if applicable, a diaphragm can preferably be arranged in the beam path upstream of the deflecting assembly. These components may—individually or in combination—either form part of the interface or be arranged in the beam path downstream of this interface. A protective window between the interface and in front of the deflecting assembly acts as a dirt protection for the optics area. A diaphragm between the end cap and the deflecting assembly allows dimming of direct laser light with higher angular proportions.

In order to allow monitoring of the working laser beam, another embodiment of the invention is characterized in that the deflecting assembly is transparent to the process light. This is achieved, in particular, by utilizing a dielectric layer system with sound transmission properties, preferably in the range between 200 and 900 nm. Transmission properties greater than 1300 nm are also particularly advantageous. In this way, a compact design for machining heads can be achieved. A simple and effective camera-based process monitoring/control can thereby also be realized, particularly when single-lens systems are used.

According to another optional characteristic of the invention, the substrate of the deflecting assembly is realized in a wedge-shaped fashion. In this way, aberrations during the transmission of the divergent process light through the deflecting assembly and, for example, to a process light camera are reduced. In this case, the wedge angles lie in the range between 0° and 5°, preferably between 0° and 3°.

According to another embodiment of the invention, a process light monitoring arrangement is positioned on the side of the deflecting assembly that lies opposite of the focusing optics.

In a system of this type, another optical system, preferably a system with variable focal length, is advantageously used between the deflecting assembly and the process monitoring/control arrangement such that an image formation of different planes of the process zone is ensured for all potential positions of the focusing optics.

A beam-shaping optical element, which optimally shapes the working laser beam for the respective machining process, may be additionally used downstream or upstream of the focusing optics.

A beam-shaping optical element, which optimally shapes the working laser beam for the respective machining process, may be additionally used downstream or upstream of the focusing optics.

The above-defined objective is also attained by means of a laser machining machine, particularly a laser cutting machine, in which a machining head according to one of the preceding paragraphs is used. It is particularly preferred that this laser machine features a laser light source, in which a fiber laser or diode laser is used.

In this laser machining machine, the laser light source is preferably connected to the machining head by means of an optical waveguide.

Other advantages, characteristics and details of the invention can be gathered from the following description of exemplary embodiments of the invention with reference to the drawings. In this context, the characteristics disclosed in the claims and in the description may respectively be essential to the invention individually or in any combination.

Analogous to the technical content of the claims and the figures, the list of reference symbol also forms part of the disclosure. The figures are described coherently and comprehensively. Identical components are identified by the same reference symbols, wherein reference symbols with different indices identify functionally identical or similar components.

DETAILED DESCRIPTION OF THE PREFERRED EMBODIMENT

Figure 1:
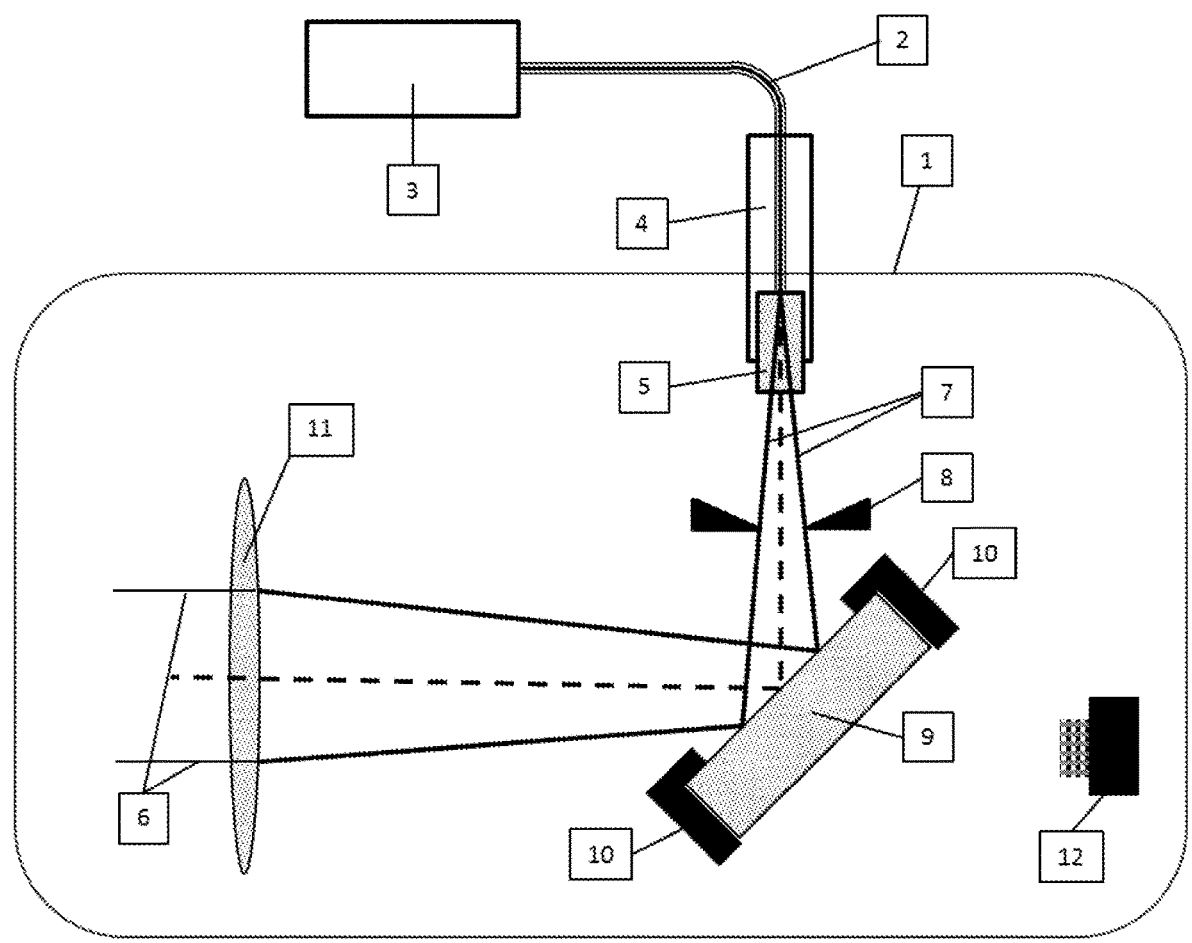
FIG. 1 shows a schematic representation of an exemplary embodiment of an inventive laser machining machine with a laser machining head, wherein a deflection is realized in the divergent beam path upstream of the focusing optics.

The laser machining machine illustrated in FIG. 1 features a laser machining head 1 that is connected to the laser light source 3, for example, by means of a fiber-optic cable 2. For this purpose, the connector 4 of the fiber-optic cable 2 is coupled to the laser machining head 1 with its end cap 5, wherein the connector 4 and the end cap 5 are connected to an interface of the machining head 1 and can be at least temporarily fixed thereon. The interface is preferably realized in the form of a counterpart of the connector 4 and designed for inserting the end cap 5 of the fiber-optic cable 2 therein, as well as for at least temporarily coupling the fiber-optic cable 2 thereto. The laser light source 3 preferably utilizes a fiber laser or diode laser, but other types of lasers may also be used. A preferred application of the present invention are laser cutting machines with a laser cutting head, in which a deflection of the working laser beam 6 takes place in the divergent beam path 7—as described in greater detail below. In this case, the working laser beam 6 exits the fiber of the fiber-optic cable 2 through the end cap 5 and is "cleaned," preferably with the beam diaphragm 8 that, if applicable, may also be arranged downstream of a deflection of the working laser beam 6. The beam portions with large angles of emergence are blanked out. Other optical systems that, if applicable, result in a slight change of the beam propagation direction, for example glass guards or the like, may also be used between the end cap 5 and a deflection of the working laser beam 6.

According to the exemplary embodiment illustrated in FIG. 1, the inventive laser machining head 1 features an optical system downstream of the interface to the connector 4 and to the end cap 5, wherein said system is designed for at least one deflection of the working laser beam 6 referred to its value upon exiting the interface. For this purpose, the optical system downstream of the interface comprises at least a first deflecting assembly 9, 10 for the working laser beam 6, wherein the beam path between the interface or between the connector 4 and the end cap 5 and the deflecting assembly 9, 10 is kept free of optical elements that change the divergence of the working laser beam 6. According to the invention, the deflecting assembly 9, 10 for the working laser beam 6 is simultaneously designed in the form of an optical system that changes the divergence of the working laser beam 6. In the inventive application in the high-power range, this change of the divergence at the deflecting assembly 9, 10 is caused due to its thermal stress only and therefore particularly takes place in a power-dependent fashion. At low output powers, it is designed as a divergence-preserving element.

The most important element of the deflecting assembly 9, 10 is an essentially planar deflecting mirror 9 that is held in a preferably stressfree mounting 10. This may be realized by means of a multi-point fastening arrangement or an adhesive connection on a supporting surface or similar structures. The deflecting mirror 9 of the deflecting assembly 9, 10 is preferably formed by a substrate with a plurality of dielectric layers applied on its front side facing the working laser beam 6. This dielectric layer system is optimized for maximum reflection in an angular range between 2° and 20°, preferably between 3° and 7°, around the angle of incidence of the working laser beam 6. In this case, any region of the working laser beam 6 typically has an angle of incidence between 1° and 89°. The angular range preferably lies between 20° and 70°.

The actual deflection takes place on the dielectric layer system of the deflecting mirror 9 applied on the front side thereof. The layer system consists of a plurality of dielectric layers in order to cover a broad angular range. If the central axis of the working laser beam 6 has an angle of incidence AOI=45°, the dielectric layer must be able to cover an angular range of AOI=45°±2° to ±20° in order to also deflect the outermost regions of the divergent working laser beam 6. The layer system is optimized for maximum reflection over the entire angular range of the laser light.

The end cap 5, any glass guards between the end cap 5 and the deflecting assembly 9, 10 and the deflecting mirror itself usually only change the divergence slightly and approximately also by the same order of magnitude. These are power-dependent thermal effects such that the influence on said divergences intensifies as the power increases. Optical elements can cause a reduction or an increase of the divergence depending on the material. At high output powers and therefore significant heating, in particular, of the substrate of the deflecting mirror 9, the divergence of the working laser beam 6 typically is slightly increased at the deflecting mirror 9, wherein this counteracts the focal point shifts of downstream optical components—particularly the focusing optics 11.

The generally complex layer system may cause stresses in the substrate of the deflecting mirror 9 which lead to a deformation. In the high-power range, additional thermal effects act upon optical components. The dielectric layer system illuminated with the laser particularly may heat up and cause a slight deformation of the substrate of the deflecting mirror 9 such that a thermal lens is created. If the mounting of the substrate allows a uniform deformation, a compensation or partial compensation of the usually occurring thermal lens of the respective imaging lens or imaging lenses can thereby be achieved. In addition to the thermal effects, scattered light effects are advantageously also taken into account in the mounting of the substrate. This is the reason why the substrate of the deflecting mirror is preferably mounted in the most stressfree fashion possible and such that the substrate can also expand or deform. This is preferably achieved by means of the aforementioned multi-point fastening arrangement or a suitable adhesive connection of the deflecting mirror 9 on a supporting surface.

In order to counteract a deformation of the substrate of the deflecting mirror 9, a stress-compensating equalization coating may be applied on the rear side of the substrate additionally or alternatively to the above-described mounting. The reflecting layer system of the front side can preferably be used for this purpose. However, the layer system may also be realized differently and, for example, have antireflective properties. A pure glass coating may likewise be considered as stress-compensating equalization layer.

The substrate of the deflecting mirror 9 may consist of different optical materials such as silica glass, sapphire or the like. The substrate may also have any geometric shape (for example angular, round or oval). The mounting 10 consists of materials (e.g. brass) that absorb as little light as possible.

At average output powers in excess of 500 W, for which the inventive system is primarily designed, the effect of a very fast shape change of the deflecting mirror 9 is achieved in any case if the deflecting mirror is respectively subjected to stress or heating. This shape change and the associated variation of the divergence-changing properties of the deflecting assembly 9, 10 at least partially compensate the variations of the divergence-changing properties of the focusing optics 11, particularly if the focusing optics are realized in the form of a single lens. The divergence-influencing effect of the deflecting assembly 9, 10 is preferably dependent on the output power of the laser source and therefore the relatively short thermalization time of the optical elements used. In this way, the deflecting assembly 9, 10 can compensate the influence of the focusing optics 11 on the divergence, which likewise changes with the output power.

An imaging optical system is arranged downstream of the deflecting assembly 9, 10 and preferably consists of a lens 11. This lens may be made of different optically transparent material such as, e.g., silica glass, ZnS, sapphire or the like. If so required, at least one beam-shaping optical element is used downstream or upstream of the focusing optics 11 in order to optimally shape the working laser beam 6 for the respective machining process.

A compensation or reduction of the focal point shift can be achieved in any case, particularly in machining heads with only one focusing lens, preferably an aspherical lens, by purposefully utilizing the power-dependent, divergence-changing properties of the deflecting assembly 9, 10. For this purpose, the materials of the focusing optics 11 and of the deflecting mirror 9 have to be adapted to one another.

A $SiO_2$ deflecting mirror is preferably used for focusing optics 11 of zinc sulfide or sapphire such that the focal point shift of the ZnS lens is reduced due to the oppositely directed shift of the deflecting mirror 9. Alternatively, a similar effect can be achieved with a combination of a sapphire lens and a $SiO_2$ deflecting mirror.

Figure 2:
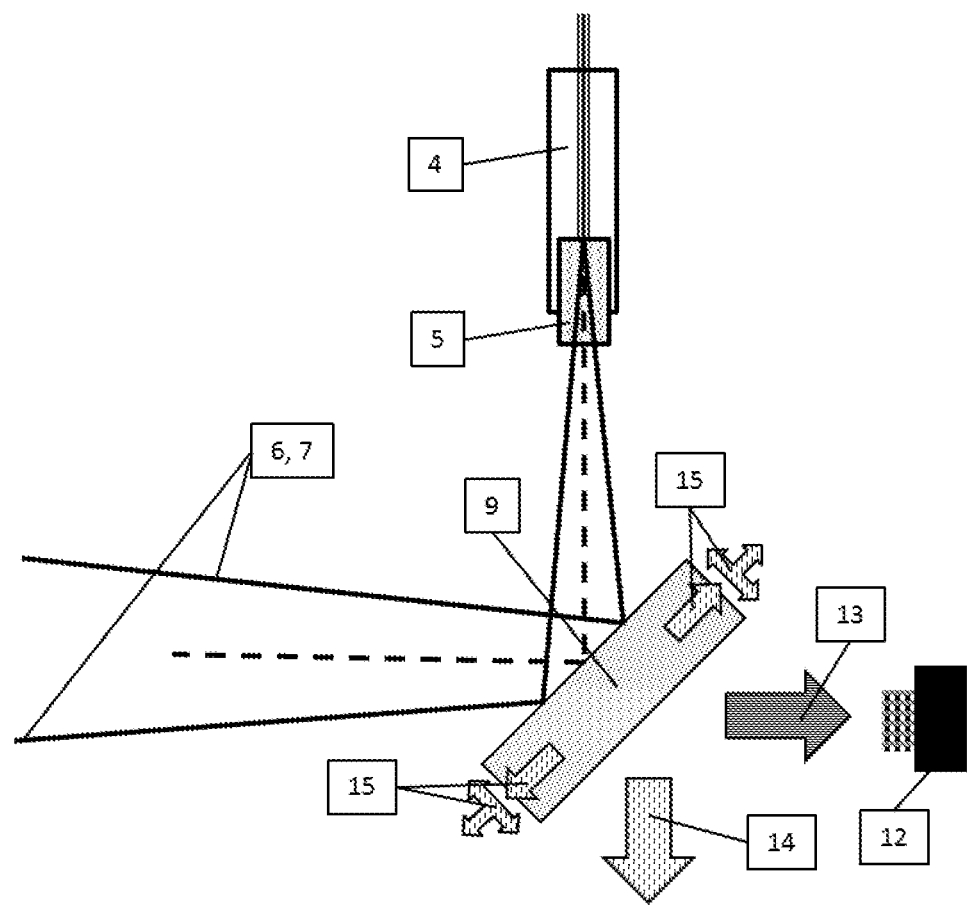
FIG. 2 shows a schematic representation of the laser reflection and the scattered light emission, as well as the directions of the leakage radiation and the process light.

FIG. 2 shows a schematic representation of the reflection of the working laser beam 6, the scattered light emission and the distortion of the substrate of the deflecting mirror 9. The scattered light effects particularly influence the deflecting assembly 9, 10 at maximum output powers. However, if the same reflective coating is used on both sides of the substrate, the leakage radiation 14 downstream of the beam deflecting mirror 9 is significantly reduced (by approximately 0.0001%). In this way, elements in the transmission of the leakage radiation 14 are protected. The scattered light 15 (approximately 0.1%) is primarily emitted from the lateral surfaces of the substrate 9.

In the direction extending opposite to the propagation direction of the working laser beam 6, the process light from the process zone is projected back on the deflecting assembly 9, 10 by the imaging optics 11 and is in contrast to the laser light transmitted as well as possible in this direction. For this purpose, the dielectric layer system is specified with sufficient transmission properties in the range between 200 and 900 nm—and preferably also above 1300 nm. In this case, the transmission of the divergent process light is typically projected on a camera arrangement 12 positioned downstream of the deflecting assembly 9, 10 referred to the propagation direction of the process light. This results in optical errors (coma errors and spherical aberrations) that can preferably be reduced with a slightly wedge-shaped design of the substrate of the deflecting mirror 9 and therefore of the entire deflecting mirror 9 including the coatings. In this case, the wedge angles lie between 0° and 5°, preferably between 0° and 3°.

An optical system with variable focal length is preferably located between the process light camera 12 and the deflecting mirror 9. In a single-lens system, the image of the process zone is thereby always projected on the CCD chip of the camera 12 in connection with effect of the wedge-shaped deflecting mirror 9. In this case, it is preferred to use modern lenses with electrically adjustable focal length ("electrically tunable lenses"), which make it possible to realize particularly lightweight and compact arrangements.

Devices for monitoring beams transmitted through the substrate or reflected within the substrate are advantageously also provided.

In summary, the inventive machining head, particularly with the proposed single-lens solution and with a deflection in the divergent beam, provides the following advantages:

Compact structural shape
Weight savings and therefore higher machine dynamics
Cost-efficient production due to the reduction of optical elements
Reduced adjustment and positioning effort
Reduced aberrations
Very high power capability
Utmost process reliability

LIST OF REFERENCE SYMBOLS

1 Machining head
2 Fiber-optic cable
3 Laser source
4 Connector of fiber-optic cable
5 End cap of fiber-optic cable
6 Working laser beam
7 Divergent beam path
8 Beam diaphragm
9 Deflecting mirror
10 Deflecting mirror mounting
11 Focusing optics
12 Process light camera
13 Process light
14 Leakage radiation
15 Scattered light

What is claimed is:

1. A machining head for laser machining machines with an interface to a laser light source and with focusing optics, a deflecting assembly for at least a single deflection of the working laser beam arranged between the interface and the focusing optics, the assembly including a deflecting mirror that changes the divergence of the working laser beam in dependence on the power and local heating of the deflecting mirror arising from the power, the deflecting mirror formed by a substrate with a plurality of dielectric layers applied on its front side facing the working laser beam, and a single lens arranged downstream from the assembly, wherein the dielectric layer system is optimized for maximum reflection in an angular range between 2° and 20° around the angle of incidence of the working laser beam such that the changes in the divergence at least partially compensate for focal point shifts in the focusing optics the optimized maximum reflection being in dependence upon at least local heating of the deflecting mirror by the incident working laser beam.

2. The machining head according to claim 1, wherein the deflecting mirror comprises a constant curvature.

3. The machining head according to claim 2, wherein the deflecting mirror is planar.

4. The machining head according to claim 2, wherein the deflecting mirror is held in a stressfree mounting.

5. The machining head according to claim 2, wherein the angle of incidence of any region of the working laser beam lies between 1° and 89°.

6. The machining head according to claim 5, wherein the dielectric layer system is optimized for maximum reflection in an angular range between 3° and 7° around the angle of incidence of the working laser beam.

7. The machining head according to claim 5, wherein the substrate of the deflecting assembly is wedge-shaped.

8. The machining head according to claim 5, wherein a stress-compensating equalization coating is applied on the rear side of the substrate, said equalization coating is at least one coating of a group that comprises coatings with the same properties as on the front side of the substrate, coatings identical to those on the front side, coatings with antireflective properties and pure glass coatings.

9. The machining head according to claim 5, further comprising at least one of a zinc sulfide lens and a sapphire lens, wherein the zinc sulfide lens and sapphire lens comprise silica glass.

10. The machining head according to claim 5, characterized in that devices for monitoring beams transmitted through the substrate or reflected within the substrate are provided.

11. The machining head according to claim 1, characterized in that at least one of a protective window and an adjustable diaphragm is arranged in the beam path upstream of the deflecting assembly.

12. The machining head according to claim 1, wherein the deflecting assembly is transmissive to the process light.

13. The machining head according to claim 12, wherein a dielectric layer system with sound transmission properties in at least one of a range between 200 and 900 nm and >1300 nm, is used on the substrate of the deflecting mirror.

14. The machining head according to claim 12, wherein a process light monitoring arrangement is positioned on the side of the deflecting assembly lying opposite of the focusing optics.

15. The machining head according to claim 14, wherein another optical system is used between the deflecting mirror of the deflecting assembly and the process light monitoring arrangement.

16. The machining head according to claim 1, wherein a beam-shaping optical element is used downstream or upstream of the focusing optics.

17. The machining head according to claim 1, wherein the single lens is an imaging lens.

18. A laser machining machine comprising a machining head for laser machining machines, with an interface to a laser light source, and with focusing optics, the laser machining machine further comprising a deflecting assembly for at least a single deflection of the working laser beam arranged between the interface and the focusing optics and designed in the form of a deflecting mirror that changes the divergence of the working laser beam in dependence on the power and local heating of the deflecting mirror arising from the power, the deflecting mirror formed by a substrate with a plurality of dielectric layers applied on its front side facing the working laser beam, and a single lens arranged downstream from the assembly, wherein the dielectric layer system is optimized for maximum reflection in an angular range between 2° and 20° around the angle of incidence of the working laser beam such that the changes in the divergence at least partially compensate for focal point shifts in the focusing optics the optimized maximum reflection being in dependence upon at least one local heating of the deflecting mirror by the incident working laser beam.

19. The laser machining machine according to claim 18, wherein the laser light source is connected to the machining head by means of an optical waveguide.

20. The laser machining machine according to claim 18, wherein the machining head is connected to a fiber coupled or fiber based laser light source.

21. The laser machining machine according to claim 18, wherein the laser light source operates in the near-infrared range and has an average output power in excess of 500 W.

22. The laser machining machine according to claim 18, wherein the laser machining machine is a laser cutting machine and the machining head is a laser cutting head.

* * * * *